United States Patent
Corson et al.

(10) Patent No.: US 8,036,104 B2
(45) Date of Patent: Oct. 11, 2011

(54) METHODS AND APPARATUS FOR IMPROVING RESILIENCY OF COMMUNICATION NETWORKS

(75) Inventors: M. Scott Corson, Chatham, NJ (US); Samir Kapoor, Doylestown, PA (US); Rajiv Laroia, Basking Ridge, NJ (US); Vincent Park, Budd Lake, NJ (US); Arthur Stephens, Hazlet, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1589 days.

(21) Appl. No.: 10/619,384

(22) Filed: Jul. 14, 2003

(65) Prior Publication Data

US 2004/0071090 A1 Apr. 15, 2004

Related U.S. Application Data

(60) Provisional application No. 60/440,276, filed on Jan. 15, 2003, provisional application No. 60/395,892, filed on Jul. 15, 2002.

(51) Int. Cl.
*G01R 31/08* (2006.01)
(52) U.S. Cl. ... 370/217; 370/242; 370/349; 370/395.31; 709/238
(58) Field of Classification Search .......... 370/216–218, 370/221, 222, 223, 224, 225, 226, 241, 241.1, 370/242, 310.2, 349, 401; 714/1, 2, 4, 5, 714/25; 709/221, 224, 238–240; 379/14.01, 379/15.01, 22.03
See application file for complete search history.

(56) References Cited

U.S. PATENT DOCUMENTS

| | | | |
|---|---|---|---|
| 5,390,326 A * | 2/1995 | Shah | 370/222 |
| 5,822,361 A | 10/1998 | Nakamura et al. | |
| 6,038,212 A | 3/2000 | Galand et al. | |
| 6,047,331 A * | 4/2000 | Medard et al. | 709/239 |
| 6,122,759 A * | 9/2000 | Ayanoglu et al. | 714/57 |
| 6,178,327 B1* | 1/2001 | Gomez | 455/445 |
| 6,192,037 B1 | 2/2001 | Spear | |
| 6,324,161 B1* | 11/2001 | Kirch | 370/217 |
| 6,366,561 B1 | 4/2002 | Bender | |
| 6,578,085 B1* | 6/2003 | Khalil et al. | 709/241 |
| 6,629,151 B1 | 9/2003 | Bahl | |

(Continued)

OTHER PUBLICATIONS

PCT International Search Report for International Application No. PCT/US03/21725, Jul. 14, 2003.

*Primary Examiner* — Kwang B Yao
*Assistant Examiner* — Jeffrey Rutkowski
(74) *Attorney, Agent, or Firm* — Jonathan T. Velasco

(57) ABSTRACT

Techniques for supporting fault tolerance in communications systems are described. Fault notification messages are communicated which may be affected by a detected/reported service disruption. End nodes receiving a fault notification message determine if the message indicates a disruption in a node that is critical to the end node receiving the message. If the indicated disruption is in a critical node, the end node takes action to ameliorate the effect of the reported condition. Fault notification messages indicating disruptions in nodes which are not critical to the end node receiving the fault notification message may be ignored once it is determined that the indicated disruption is in a node which is not critical to the end node receiving the message. The invention described herein minimizes service disruption following fault, failure or outage of critical network nodes, improving overall system robustness and resiliency.

35 Claims, 7 Drawing Sheets

U.S. PATENT DOCUMENTS

| | | | |
|---|---|---|---|
| 6,665,262 B1* | 12/2003 | Lindskog et al. | 370/216 |
| 7,058,007 B1* | 6/2006 | Daruwalla et al. | 370/216 |
| 7,120,690 B1* | 10/2006 | Krishnan et al. | 709/225 |
| 7,133,667 B2* | 11/2006 | Suzuki et al. | 370/217 |
| 7,161,897 B1* | 1/2007 | Davies et al. | 370/217 |
| 2001/0024443 A1* | 9/2001 | Alriksson et al. | 370/401 |
| 2001/0034228 A1* | 10/2001 | Lehtovirta et al. | 455/424 |
| 2002/0048260 A1* | 4/2002 | Iidaka | 370/242 |
| 2002/0067704 A1 | 6/2002 | Ton | |
| 2002/0080794 A1* | 6/2002 | Reeves et al. | 370/395.2 |
| 2002/0116669 A1* | 8/2002 | Jain | 714/43 |
| 2002/0147837 A1 | 10/2002 | Heller | |
| 2003/0002462 A1* | 1/2003 | Tanoue | 370/216 |
| 2003/0016629 A1* | 1/2003 | Bender et al. | 370/245 |
| 2003/0022666 A1* | 1/2003 | Sato | 455/423 |
| 2003/0229818 A1* | 12/2003 | Dunlop et al. | 714/4 |
| 2004/0049565 A1* | 3/2004 | Keller et al. | 709/223 |
| 2004/0081086 A1* | 4/2004 | Hippelainen et al. | 370/227 |
| 2004/0114511 A1* | 6/2004 | Mochizuki et al. | 370/217 |
| 2005/0083832 A1* | 4/2005 | Shimono | 370/216 |

* cited by examiner

| Fault Identification Information | | Response Action |
|---|---|---|
| Critical Node | Fault Type | |
| Mobility Agent Node | Failure | Register with a new mobility agent node. |
| | Reboot | Re-register with the same mobility agent node. |
| | Scheduled Outage | (1) Determine time of scheduled outage from network fault notification signal. (2) Set timer to alert local mobility client prior to scheduled outage. (3) Upon expiration of timer, reregister with a new mobility agent node. |
| Session Signaling Server Node | Failure | Register with a new session signaling server node. |
| | Reboot | Re-register with the same session signaling server node. |
| | Scheduled Outage | (1) Determine time of scheduled outage from network fault notification signal. (2) Set timer to alert local session signaling client prior to scheduled outage. (3) Upon expiration of timer, reregister with a new session signaling server node. |
| Access Node | Reboot | (1) Re-access system. (2) Execute normal start-up authentication and authorization procedures. |
| | Overload | Exit system for pre-determined period of time. |

FIG. 6

METHODS AND APPARATUS FOR IMPROVING RESILIENCY OF COMMUNICATION NETWORKS

RELATED APPLICATIONS

The present application claims the benefit of U.S. Provisional Patent Application Ser. No. 60/440,276 filed Jan. 15, 2003, titled "Methods and Apparatus for Supporting Fault Tolerant Communication Networks through Fault Notification Signaling" and U.S. Provisional Patent Application Ser. No. 60/395,892 filed Jul. 15, 2002, titled "Methods and Apparatus for Improving Resiliency of Communication Networks through Fault Notification Signaling", both of which are hereby expressly incorporated by reference.

FIELD OF THE INVENTION

This invention relates to communications system and, more particularly, to methods and apparatus for supporting fault tolerance in a communications network, e.g., a cellular communication network including one or more mobile subscriber devices.

BACKGROUND

Communication systems and networks provide the foundation for information exchange between end systems and users. In general, the ability to exchange information between two end systems may be dependent on a number of other network nodes, i.e., critical network nodes. Critical network nodes may include, for example, nodes along the path for delivery of data and/or control signals, e.g., messages. In some communication systems, the set of critical nodes may also include nodes that are used for service authorization, accounting, call setup, paging and many other functions. Ideally, a communication system or network should provide some level of robustness in order to be useful. Robustness in communication systems may be achieved in many ways including, use of high reliability components, system design redundancy, and fault tolerant protocol designs.

A common fault tolerant protocol design technique relies on what is known as a soft-state refresh mechanism. In this type of approach, state, e.g., information about a device or communications session, that is established in a component or system as a result of the protocol operation is only considered valid (and thus maintained) for a fixed period of time after it is established. Upon expiration of a soft-state time-out, the state is removed from the system. Thus, if the state is required for a period of time longer than the soft-state time-out, the state must be refreshed via protocol signaling prior to expiration of the soft-state time-out. This is the primary approach used for most Internet Protocol (IP) technology. Furthermore, in many cases IP technology places the burden of performing the soft-state refresh on the end system. This is consistent with the end-to-end design principle, which is one of the guiding philosophies of IP technology. This principle suggests that functions placed at low levels of a system may be redundant or of little value when compared with the cost of providing them at that low level. One implication of this principle is that complexity should be put in the end systems, leaving the intervening network simple. Note that this is in contrast with most circuit-switch communication systems that strive to keep end systems simple.

While there are many benefits of a soft-state refresh mechanism, there are also some significant limitations. One of the limitations of soft-state refresh mechanisms is the tradeoff between timeliness of detecting (and potentially recovering from) failures and communication overhead. Faster failure detection/recovery is achieved by making soft-state time-out values small, but this also has the effect of increasing protocol signaling and communication overhead. In large-scale communication networks this can also impact scalability. For example, in a cellular communication system the number of end nodes may be very large. If each end node uses a soft-state refresh mechanism to maintain connectivity via a central network node, e.g., a mobility agent node, the use of small soft-state time-out values also increases the signaling and processing burden of the mobility agent node. Therefore, it may not be practical to reduce soft-state time-out values below some threshold. This in turn limits timeliness of detection/recovery from failures and results in longer service disruption times following a failure.

In view of the above discussion, it is apparent that there is a need for improved methods and apparatus for supporting fault tolerant communication networks.

BRIEF DESCRIPTION OF THE FIGURES

FIG. 6 depicts a tabular representation of an exemplary fault response database as may be maintained by end node implemented in accordance with the invention.

SUMMARY OF THE INVENTION

Figure 1:
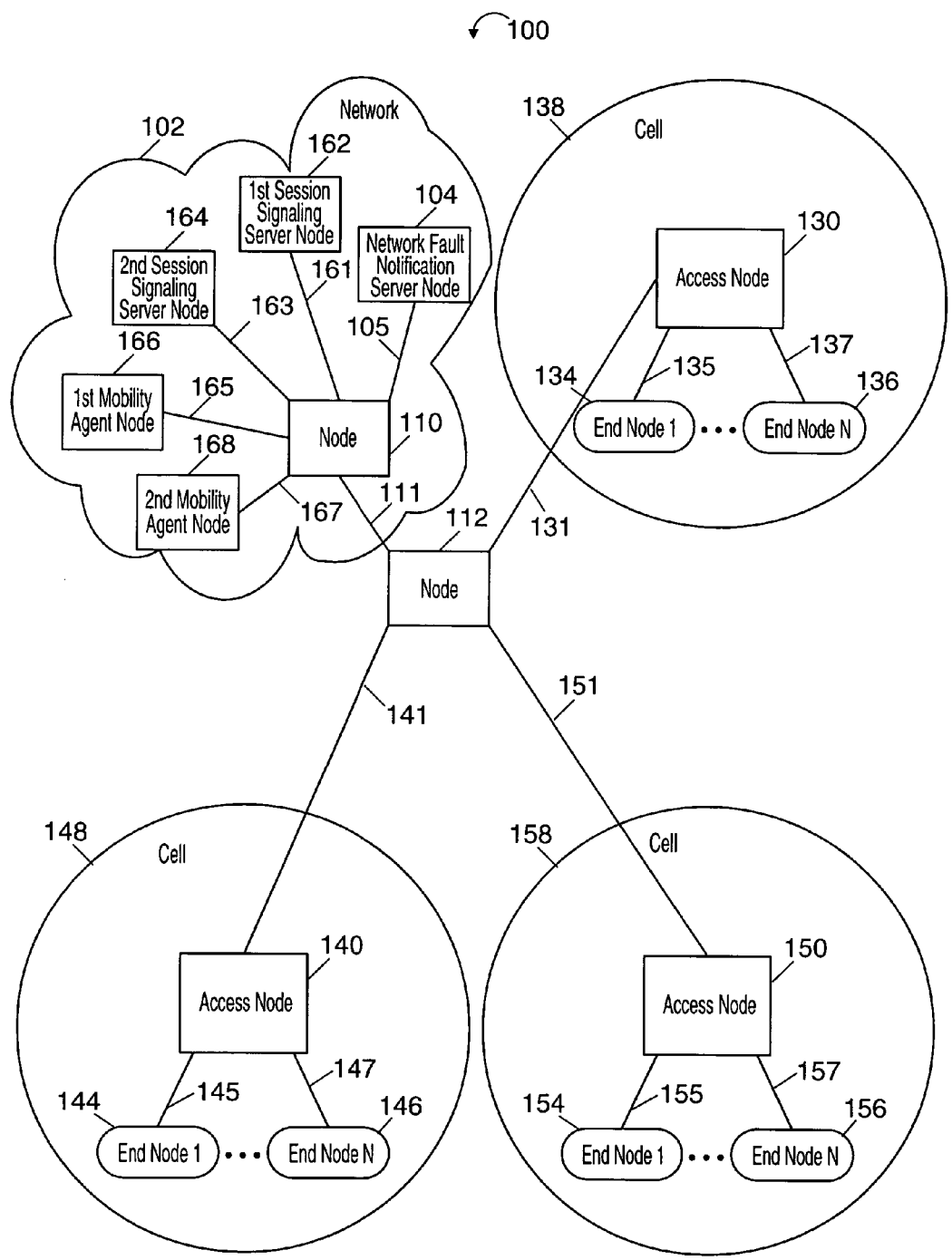
FIG. 1 illustrates a network diagram of a communications system implemented in accordance with an exemplary embodiment of the invention.

Methods and apparatus of the present invention can be used to support fault tolerant communication systems, e.g., networks. In particular, methods and apparatus of the present invention can be used to monitor the status of one or more network nodes, detect faults, errors, and/or failure of said network nodes and disseminate notifications of interference with service, e.g., network faults or scheduled outages, to affected nodes, e.g., one or more end nodes. The communication system may be, e.g., a cellular communication network wherein some end nodes are wireless devices that include receiver and transmitter circuitry to support communications with wireless access nodes via a wireless communications channel. The end nodes, e.g., mobile wireless devices, may also include an IP host protocol stack. The access nodes, e.g., base stations, may, in addition to performing other functions, function as IP access routers. Additionally, methods and apparatus of the present invention can be used to speed recovery of affected nodes that receive network fault or scheduled outage notifications and thus minimize service disruptions.

Various features of the present invention are directed to detecting and reporting of network faults. Additional features of the present invention take advantage of an end node's ability to store information about which network nodes are critical, e.g., important or necessary for the routing of information and/or signals to/from the end node, to process fault messages relating to network nodes and/or to take steps to ameliorate and/or eliminate the effect of faults reported to the end node. By storing such information in a mobile end node, e.g., wireless device, thus enabling the end node to respond to service interference notifications, loading on an air link used to couple mobile nodes to an access node, e.g., base station, can be minimized while still providing for a high degree of fault tolerance.

The information in an end node used to determine if a particular network node is critical to the end node may be statically preprogrammed information, dynamically generated information, e.g., where critical node information is determined during normal operation of other protocols and signaling, and/or a combination of static and dynamic information. In the case of dynamically generated information, in various embodiments one or more Mobile IP agent solicitation messages, Mobile IP agent advertisement messages, Mobile IP registration messages and Mobile IP registration reply messages transmitted to/from an end node are monitored by the end node and the information included therein is used by the end node to identify critical nodes and related information which is then stored in the end node.

The methods and apparatus of the present invention may be used in combination with other traditional robustness mechanisms such as soft-state refresh. The addition of the features described herein can be used to improve overall system robustness and resiliency and minimize service disruption following fault or failure of critical network nodes or any interference with service provided by critical network nodes, while still maintaining communications efficiency and minimizing communication overhead. Thus, the methods and apparatus of the present invention are particularly well suited for use in wireless communication systems, e.g., cellular networks. The invention is also particularly well suited for use with connectionless packet-switch networking, e.g. IP internetworking.

FIG. 1 illustrates an exemplary communication system 100 that comprises a plurality of nodes interconnected by links, e.g., a communication network. IP packets may be used for the exchange of both data and control signaling between nodes in the system. In either case, delivery of IP packets from a source node to the targeted destination node or nodes may use either unicast or multicast addressing and delivery mechanisms. In the exemplary system, end nodes may be implemented as wireless devices that include receiver and transmitter circuitry to support communications with wireless access nodes via a wireless communications channel. End nodes may be, for example, mobile devices and may include an IP host protocol stack. The access nodes may be, for example, base stations in a cellular communications system and may also function as IP access routers. The exemplary communications system, e.g., network, implemented in accordance with the invention includes a network fault notification server node that assists in detection and notification of interference with service, e.g., faults, failure or congestion, at critical network nodes. The network fault notification server node may be, for example, a network management station, which includes an IP protocol stack and utilizes the Simple Network Management Protocol (SNMP).

A network fault notification server node implemented in accordance with the present invention is capable of operating such that it can detect interference with service due to faults or failure of critical network nodes, e.g., Mobile IP home agents, Session Initiation Protocol (SIP) servers, Authorization Authentication and Accounting (AAA) servers, paging agents, and/or loss of connectivity with a critical network node, e.g., link failure. A network fault notification server is also capable of sending an indication of detected faults and/or other service interference conditions in a signal to one or more other network nodes, e.g., a set of affected end nodes. In accordance with the present invention, network fault notification signals include information to assist recovery of affected nodes, e.g., identification of relevant critical node, type of fault or failure, alternative nodes that provide equivalent service.

An access node implemented in accordance with the present invention is capable or relaying and/or sending network fault notification signals to directly connected end nodes. Additionally, according to the invention, an access node may also provide network fault detection capability and send network fault notification signal in response to detected faults.

An end node implemented in accordance with the present invention includes fault recovery logic and processing information sufficient to determine the appropriate course of action upon reception of service interference, e.g., network fault notification, signals. Thus, end nodes are capable of processing network fault notification signals, initiating a recovery operation in response and/or taking other steps to minimize service disruption due to the fault. An end node may include additional internal network fault processing information to assist in determination of the appropriate response to a specific network fault notification. The internal network fault processing information may be statically pre-configured in an end node or dynamically configured/updated during operation of the end node.

Numerous additional embodiments, features, and advantages of the methods and apparatus of the invention are discussed in the detailed description that follows.

DETAILED DESCRIPTION

FIG. 1 illustrates an exemplary communication system 100, e.g., a communication network, that comprises a plurality of nodes interconnected by communications links. The communications links of the system 100 may be implemented, for example, using wires, fiber optic cables, and/or wireless communications techniques. The exemplary communication system 100 includes a plurality of end nodes 134, 136, 144, 146, 154, 156, implemented in accordance with the present invention, which access the communication system via a plurality of access nodes 130, 140, 150, also implemented in accordance with the present invention. The end nodes 134, 136, 144, 146, 154, 156 may be, e.g., wireless communication devices, and the access nodes 130, 140, 150 may be, e.g., wireless access routers or base stations. The exemplary communication system 100 also includes a number of other nodes as may be needed to provide interconnectivity or to provide specific services or functions. Specifically, the exemplary communication system 100 includes a plurality of mobility agent nodes 166, 168, e.g., Mobile IP home agents, as may be needed to support mobility of end nodes between access nodes, and a plurality of session signaling server nodes 162, 164, e.g., SIP proxy servers, as may be needed to support establishment and maintenance of communication sessions between end nodes. The exemplary communication system 100 also includes a network fault notification server node 104, implemented in accordance with the present invention, which supports detection of network faults and dissemination of service interference notification information, e.g., messages which provide network fault information, to other network nodes.

The FIG. 1 exemplary system 100 depicts a network 102 that includes the network fault notification server node 104, a 1$^{st}$ session signaling server node 162, a 2$^{nd}$ session signaling server node 164, a 1$^{st}$ mobility agent node 166 and a 2$^{nd}$ mobility agent node 168, each of which is connected to an intermediate network node 110 by a corresponding network link 105, 161, 163, 165, 167, respectively. The intermediate network node 110 in the network 102 also provides interconnectivity to network nodes that are external from the perspective of the network 102 via network link 111. Network link 111 is connected to another intermediate network node 112, which provides further connectivity to a plurality of access nodes 130, 140, 150 via network links 131, 141, 151, respectively.

Each access node 130, 140, 150 is depicted as providing connectivity to a plurality of N end nodes (134, 136), (144, 146), (154, 156), respectively, via corresponding access links (135, 137), (145, 147), (155, 157), respectively. In the exemplary communication system 100, each access node 130, 140, 150 is depicted as using wireless technology, e.g., a wireless access link, to provide access. A coverage area, e.g., communications cell, 138, 148, 158 of each access node 130, 140, 150, respectively, is illustrated as a circle surrounding the corresponding access node.

Alternative embodiments of the invention include various network topologies, where the number and type of network nodes, the number and type of links, and the interconnectivity between nodes may differ from that of the exemplary communication system 100 depicted in FIG. 1.

Figure 2:
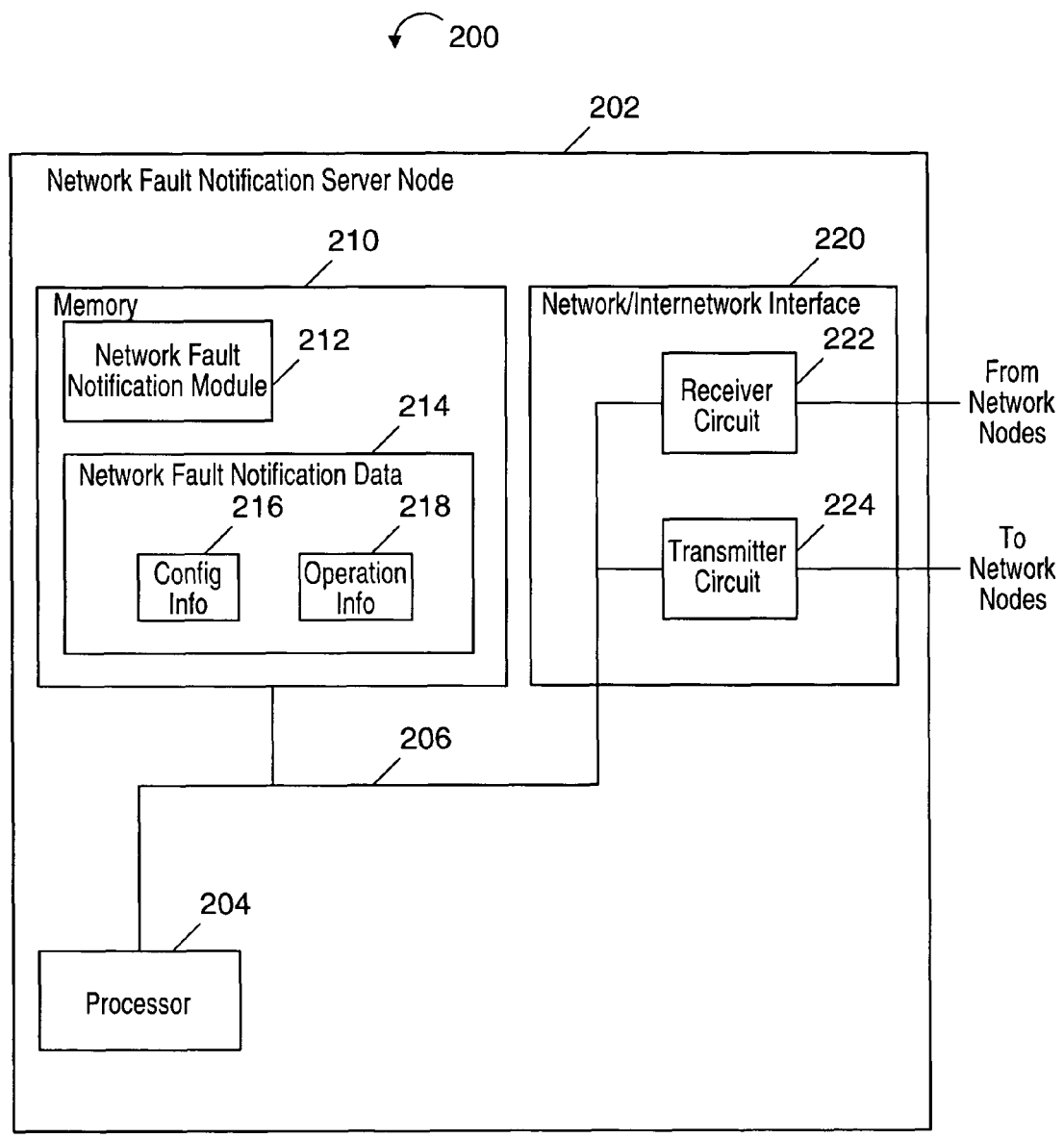
FIG. 2 illustrates an exemplary network fault notification server node implemented in accordance with the present invention.

FIG. 2 provides a detailed illustration of an exemplary network fault notification server node 200 implemented in accordance with the present invention. The exemplary network fault notification server node 200, depicted in FIG. 2, is a detailed representation of an apparatus that may be used as the network fault notification server node 104, depicted in FIG. 1. In the FIG. 2 embodiment, the network fault notification server node 200 includes a processor 204, a network/internetwork interface 220 and memory 210, coupled together by bus 206. Accordingly, via bus 206 the various components of the network fault notification server node 200 can exchange information, signals and data. The components 204, 206, 210, 220 of the network fault notification server node 200 are located inside a housing 202.

The network/internetwork interface 220 provides a mechanism by which the internal components of the network fault notification server node 200 can send and receive signals to/from external devices and network nodes. The network/internetwork interface 220 includes, a receiver circuit 222 and a transmitter circuit 224 used for coupling the node 200 to other network nodes, e.g., via fiber optic lines.

The processor 204 under control of various modules, e.g., routines, included in memory 210 controls operation of the network fault notification server node 200 to perform various signaling, processing, fault detection and fault notification as discussed below. The modules included in memory 210 are executed on startup or as called by other modules. Modules may exchange data, information, and signals when executed. Modules may also share data and information when executed. In the FIG. 2 embodiment, the memory 210 of the network fault notification server node 200 of the present invention includes a network fault notification module 212 and network fault notification data 214.

The network fault notification module 212 controls the operation of the network fault notification server node 200 to support detection of network faults, processing of network fault indications and signaling notification of service interference, e.g., network faults and/or scheduled service interruptions, to other nodes. Thus, module 212 controls processing of received signals, e.g., messages, indicating the status or faults of other network nodes and sending of subsequent signals, e.g., messages, as required to notify other network nodes of relevant network faults. The network fault notification data 214 includes, e.g., parameters, network information, network fault information and/or other information relating to detecting, processing and signaling notification of network faults. In particular, the network fault notification data 214 may include configuration information 216, e.g., information about critical nodes in the network, possible faults and required response to detected faults, and operational information 218, e.g., information about the current faults and pending responses. The network fault notification module 212 may access and/or modify the network fault notification data 214 when executed. Thus, the network fault notification module 212 may access and update the configuration information 216 and the operational information 218.

Figure 3:
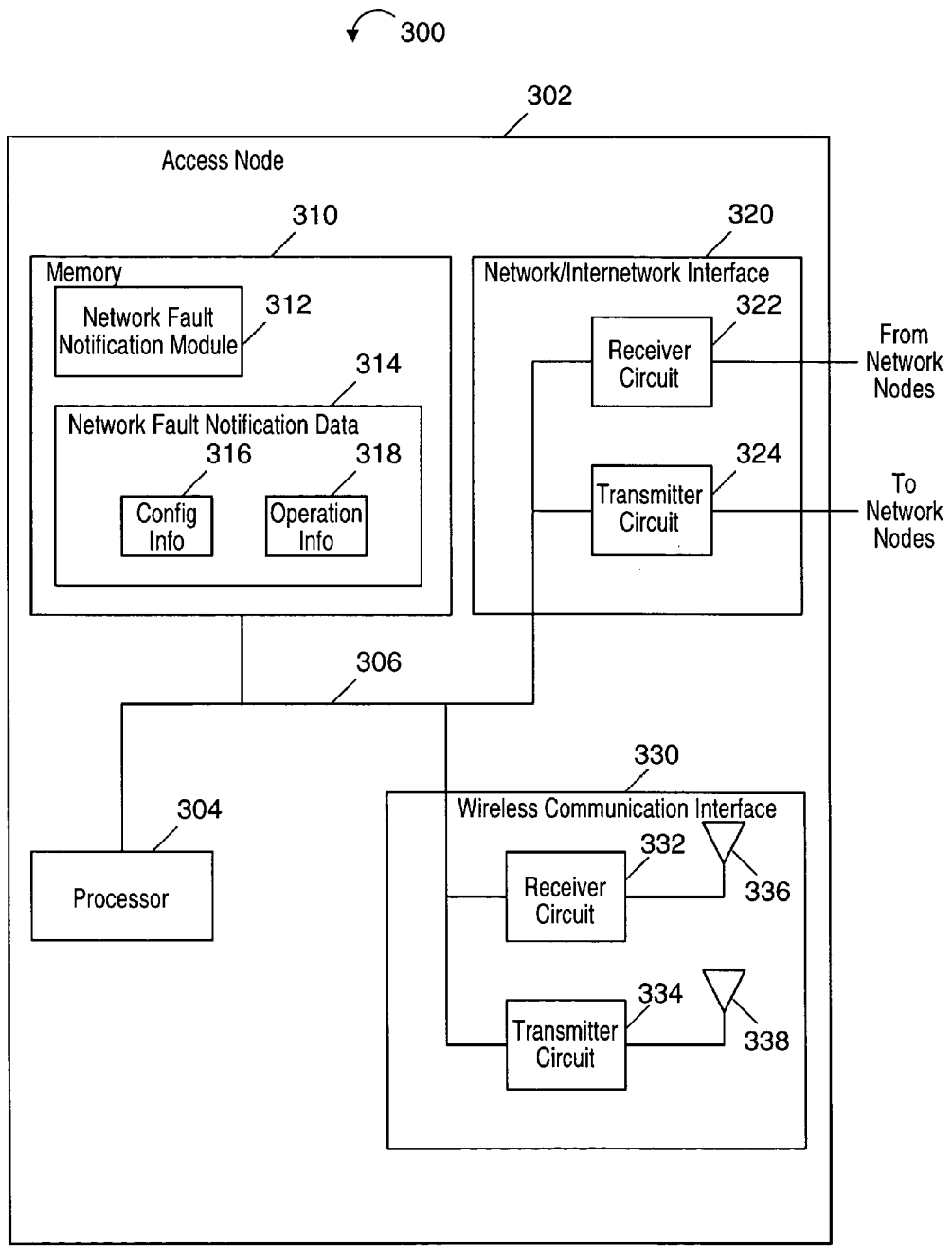
FIG. 3 illustrates an exemplary access node implemented in accordance with the present invention.

FIG. 3 provides a detailed illustration of an exemplary access node 300 implemented in accordance with the present invention. The exemplary access node 300, depicted in FIG. 3, is a detailed representation of an apparatus that may be used as any one of the access nodes 130, 140, 150, depicted in FIG. 1. In the FIG. 3 embodiment, the access node 300 includes a processor 304, a network/internetwork interface 320, a wireless communication interface 330 and memory 310, coupled together by bus 306. Accordingly, via bus 306 the various components of the access node 300 can exchange information, signals and data. The components 304, 306, 310, 320, 330 of the access node 300 are located inside a housing 302.

The network/internetwork interface 320 provides a mechanism by which the internal components of the access node 300 can send and receive signals to/from external devices and network nodes. The network/internetwork interface 320 includes, a receiver circuit 322 and a transmitter circuit 324 used for coupling the node 300 to other network nodes, e.g., via fiber optic lines. The wireless communication interface 330 also provides a mechanism by which the internal components of the access node 300 can send and receive signals to/from external devices and network nodes, e.g., end nodes. The wireless communication interface 330 includes, e.g., a receiver circuit 332 with a corresponding receiving antenna 336 and a transmitter circuit 334 with a corresponding transmitting antenna 338 used for coupling the access node 300 to other network nodes, e.g., via wireless communications channels.

The processor 304 under control of various modules, e.g., routines, included in memory 310 controls operation of the access node 300 to perform various signaling, processing, fault detection and fault notification as discussed below. The modules included in memory 310 are executed on startup or as called by other modules. Modules may exchange data, information, and signals when executed. Modules may also share data and information when executed. In the FIG. 3 embodiment, the memory 310 of the access node 300 of the present invention includes a network fault notification module 312 and network fault notification data 314.

The network fault notification module 312 controls the operation of the access node 300 to support detection of network faults, processing of network fault indications and signaling notification of service interference, e.g., network faults and/or scheduled service interruptions, to other nodes.

Thus, module 312 controls processing of received signals, e.g., messages, indicating the status or faults of other network nodes and sending of subsequent signals, e.g., messages, as required to notify other network nodes of relevant network faults. The network fault notification data 314 includes, e.g., parameters, network information, communication session information, network fault information and/or other information relating to detecting, processing and signaling notification of network faults. In particular, the network fault notification data 314 may include configuration information 316, e.g., information about critical nodes in the network, possible faults and required response to detected faults, and operational information 318, e.g., information about the current faults and pending responses. The network fault notification module 312 may access and/or modify the network fault notification data 314 when executed. Thus, the network fault notification module 312 may access and update the configuration information 316 and the operational information 318.

Figure 4:
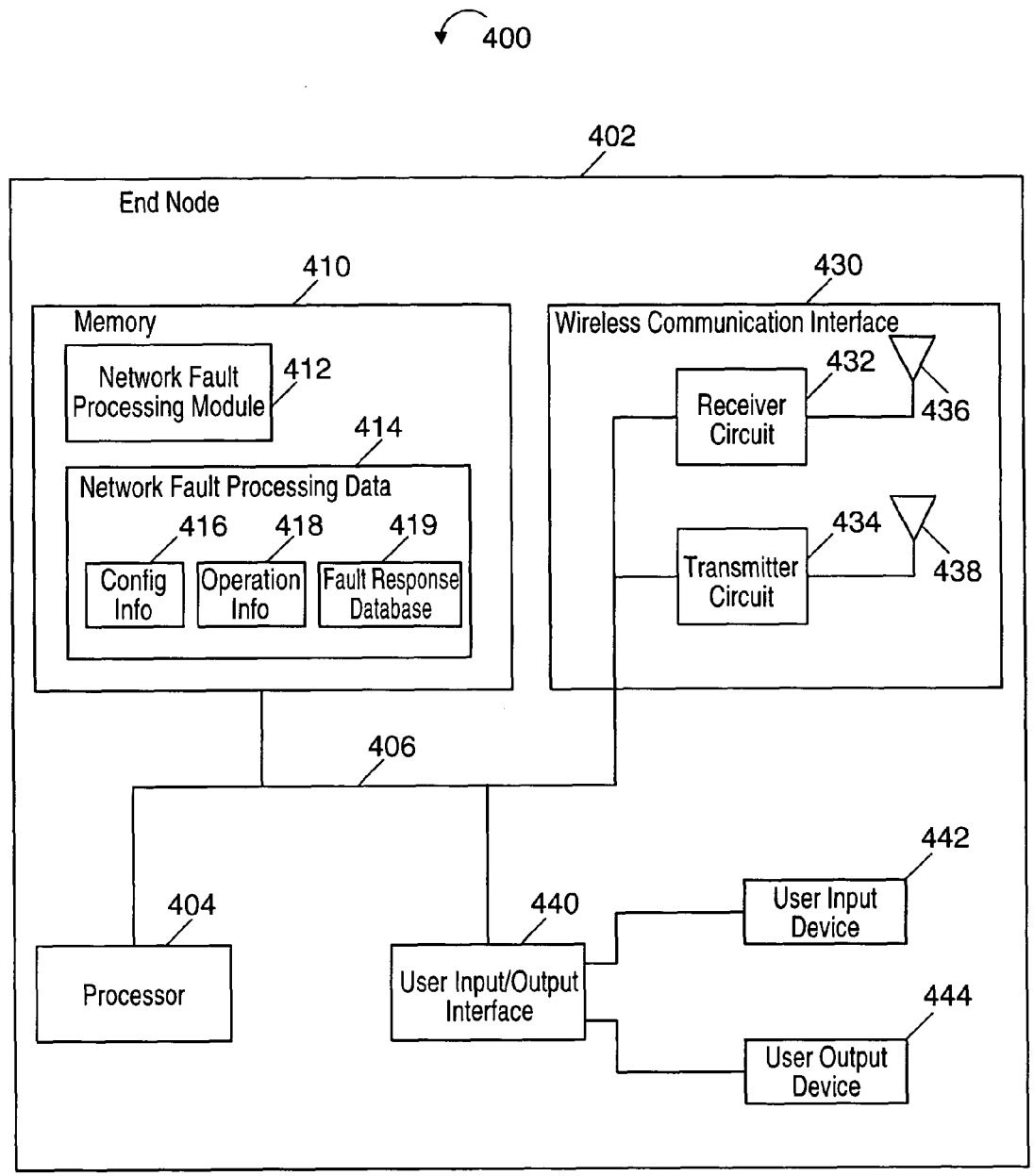
FIG. 4 illustrates an exemplary end node implemented in accordance with the present invention.

FIG. 4 provides a detailed illustration of an exemplary end node 400 implemented in accordance with the present invention. The exemplary end node 400, depicted in FIG. 4, is a detailed representation of an apparatus that may be used as any one of the end nodes 134, 136, 144, 146, 154, 156, depicted in FIG. 1. In the FIG. 4 embodiment, the end node 400 includes a processor 404, a wireless communication interface 430, a user input/output interface 440 and memory 410 coupled together by bus 406. Accordingly, via bus 406 the various components of the end node 400 can exchange information, signals and data. The components 404, 406, 410, 430, 440 of the end node 400 are located inside a housing 402.

The wireless communication interface 430 provides a mechanism by which the internal components of the end node 400 can send and receive signals to/from external devices and network nodes, e.g., access nodes. The wireless communication interface 430 includes, e.g., a receiver circuit 432 with a corresponding receiving antenna 436 and a transmitter circuit 434 with a corresponding transmitting antenna 438 used for coupling the end node 400 to other network nodes, e.g., via wireless communications channels. The exemplary end node 400 also includes a user input device 442, e.g., keypad, and a user output device 444, e.g., display, which are coupled to bus 406 via the user input/output interface 440. Thus, user input/output devices 442, 444 can exchange information, signals and data with other components of the end node 400 via user input/output interface 440 and bus 406.

The processor 404 under control of various modules, e.g., routines, included in memory 410 controls operation of the end node 400 to perform various signaling and fault processing as discussed below. The modules included in memory 410 are executed on startup or as called by other modules. Modules may exchange data, information, and signals when executed. Modules may also share data and information when executed. In the FIG. 4 embodiment, the memory 410 of end node 400 of the present invention includes a network fault processing module 412 and network fault processing data 414.

The user input/output interface 440 and associated devices 442, 444 provide a mechanism by which a user can operate the end node 400 to accomplish certain tasks. In particular, the user input device 442 and user output device 444 provide the functionality that allows a user to control the end node 400 and applications, e.g., modules, programs, routines and/or functions, that execute in the memory 410 of the end node 400.

The network fault processing module 412 controls the operation of the end node 400 to receive and respond to notification of service interference, e.g., network faults and/or service interruptions. Thus, module 412 controls processing of received signals, e.g., messages, indicating the status or faults and/or scheduled service interruptions of other network nodes and sending of subsequent signals, e.g., messages, as required to notify other modules in memory 410 of the end node 400 of relevant network faults. Network fault processing data 414 includes, e.g., parameters, status information, communication session information, network fault information and/or other information relating to processing and responding to network faults. In particular, the network fault processing data 414 may include configuration information 416, e.g., information about monitoring for network fault notification signals, and operational information 418, e.g., information about the current faults and status of pending responses. In some embodiments, the network fault processing data 414 also includes a fault response database 419, which provides, for example, information about critical nodes that are important to the operation of the end node, possible faults in said critical nodes, and corresponding actions or operations that should be initiated in response to reported faults in said critical nodes. In various embodiments of the present invention, the fault response database includes a list of critical network nodes upon which the end node is dependent and a list of one or more fault types associated with each critical network node in the list as well as an action or operation to be initiated in response to notification of the corresponding fault. The information maintained in the fault response database 419 may include statically preprogrammed information, dynamically generated information, or a combination of both static and dynamic information. The network fault processing module 412 may access and/or modify the network fault processing data 414 when executed. Thus, the network fault processing module 412 may access and update the configuration information 416, the operational information 418 and the fault response database 419.

Figure 5:
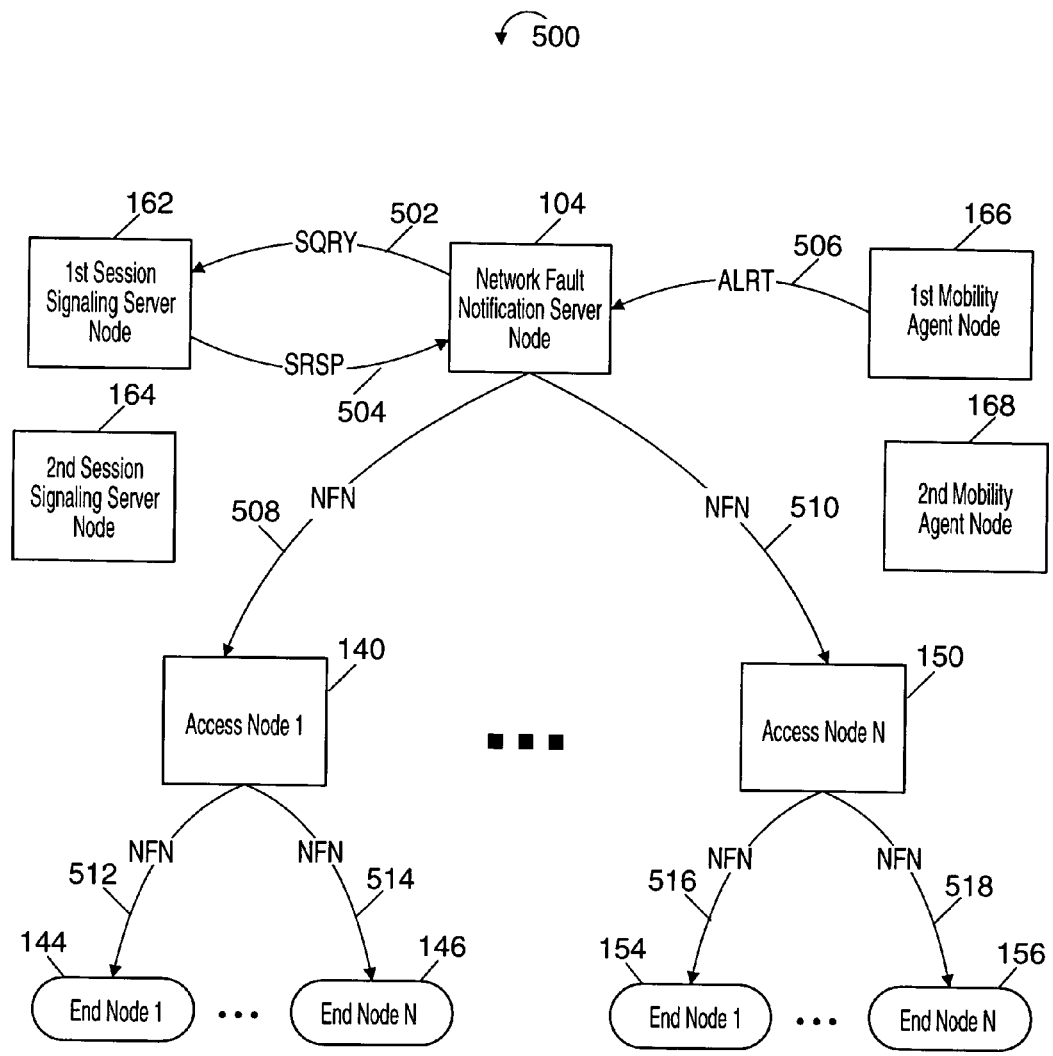
FIG. 5 illustrates signaling performed in the exemplary communication system as part of the processes of detecting network faults and sending notification of network faults from a network fault notification server node to other nodes in the system in accordance with an exemplary embodiment of the invention.

FIG. 5 provides an example of the signaling that may occur between an exemplary set of nodes 500 implemented according to this invention. The FIG. 5 embodiment comprises a network fault notification server node 104 implemented according to the present invention, e.g., as shown in FIG. 2, a plurality of access nodes 140, 150 implemented according to this present invention, e.g., as shown in FIG. 3, and a plurality of end nodes 144, 146, 154, 156 implemented according to this present invention, e.g., as shown in FIG. 4, where each of the depicted nodes is part of a communications system, e.g., as shown in FIG. 1, and thus are able to exchange communications signals, e.g., messages. FIG. 5 also depicts a plurality of session signaling server nodes 162, 164 and a plurality of mobility agent nodes 166, 168, as exemplary critical network nodes, where other network nodes, e.g., end nodes, should be notified of faults in such critical network nodes. Critical network nodes are nodes that can interfere with important communication system features in the event of faults or other conditions that interfere with service, e.g., limiting or perplexing communication between other nodes. In accordance with the present invention, critical nodes may include specialized network fault notification modules and data, or extensions to other internal modules, to support signaling and interaction with the network fault notification server node 104.

The following describes the events, signals, and operations associated with detecting faults in critical nodes and sending notification of faults to other network nodes. The arrows in FIG. 5 represent signals, e.g., messages, exchanged between nodes as part of the present invention process of fault detection and notification. It is assumed that initially the system is idle, i.e., there are no current faults and there is no pending processing or signaling associated with any prior faults.

In one embodiment of the present invention, the network fault notification server node 104 monitors the status of other critical network nodes, e.g., the session signaling server nodes 162, 164 and the mobility agent nodes 166, 168. Detection of faults in critical network nodes may be either implicit, e.g., failure of a critical node to respond to a query from the network fault notification server node, or explicit, e.g., unsolicited alert signal sent from a critical network node to the network fault notification server node. The explicit mechanism can provide a timely indication of some faults with minimal signaling. However, the explicit mechanism may fail to provide indication of certain faults, such as hardware failure or loss of connectivity to a critical network node. In many cases, the implicit mechanism can be used to detect such failures. Thus, a combination of both implicit and explicit mechanisms may be used depending of system constraints and performance requirements. FIG. 5 illustrates both implicit and explicit fault detection mechanisms.

In the FIG. 5 example the, network fault notification server node 104 sends a SQRY (status query) signal 502, to a $1^{st}$ session signaling server node 162. Upon reception of the SQRY signal 502, the $1^{st}$ session signaling server node 162 determines the operational status of its critical internal modules, e.g., processes, routines and/or hardware elements, and returns a SRSP (status response) signal 504 to the network fault notification server node 104. The SRSP signal 504 may provide an explicit indication of a fault e.g., a particular detected fault, in the $1^{st}$ session signaling server node 162 or, alternatively, indicate that no faults were detected.

In some embodiments, if the network fault notification server node 104 does not receive the SRSP signal 504 in response to the SQRY signal 502 within a predetermined period of time, expiration of an associated timer maintained by the network fault notification server node 104 is treated as an implicit indication of a fault associated with the $1^{st}$ session signaling server node 162. Note that, in some embodiments of the present invention, the network fault notification server node 104 is implemented such that an implicit indication of a fault requires multiple SQRY signals to be sent without reception of a corresponding SRSP signal. For example, in some embodiments, an implicit fault is declared by the network fault notification server 104 only after it fails to detect a response to a preselected number of consecutive SQRY signals sent to a node. In one such embodiment, the network fault notification sever node 104 maintains a count of consecutive unanswered SQRY signals sent to a node or device, compares the count to a preselected threshold, e.g., 3, and determines that an implicit fault condition exists whenever the unanswered SQRY count equals or exceeds the threshold.

In an alternative fault detection mechanism also depicted in FIG. 5, a critical network node, e.g., a $1^{st}$ mobility agent node 166, monitors the operational status of its critical internal modules, e.g., process or routines, and provide an explicit indication of faults to the network fault notification server node 104. For example, the $1^{st}$ mobility agent node 166 determines if there is a loss of operational state following a system crash or restart and sends an ALRT (alert) signal 506 to the network fault notification server node 104 when such a loss of information is detected.

Upon detection of a fault via either an implicit or explicit mechanism, the network fault notification server node 104 accesses its internal network fault notification data 214, as depicted in FIG. 2, to determine the type of fault and any action required. This operation may include, e.g., assessment of the severity of the detected fault, determination of a set of affected network nodes and/or determination of the need to send an indication of the detected network fault to some set of network nodes. In some embodiments, fault type and other information is determined by comparing a fault type indication included in a received message (SRSP or ALRT) to a list of stored fault types and related information stored as part of data 214. For example, in the context of a cellular network, the details of the detected fault and internal network fault notification data 214, may be used to determine if a notification should be sent to end nodes in an individual cell/sector, a group of cells/sectors, an administrative domain, or throughout the entire network. The FIG. 5 example illustrates the case where the type of detected fault, e.g., loss of mobility agent state information following a restart, indicates that the end nodes 144, 146, 154, 156 receive notification of the detected fault.

In accordance with the present invention, upon detection of a fault at a critical node, the network fault notification server node 104 sends a service interference notification signal, referred to sometimes as a network fault notification (NFN) signal 508, 510. The signal 508, 510 is sent to one or more other network nodes, e.g., access nodes 140, 150 as depicted in the FIG. 5 example. In some embodiments of the present invention, some network nodes, e.g., the access nodes 140, 150, relay the NFN signals 508, 510 from the network fault notification server node 104 to other network nodes, e.g., end nodes (144, 146), (154, 156). In some embodiments, nodes that relay NFN signals, e.g., access nodes 140, 150 as depicted in FIG. 5, filter, extend and/or modify the NFN signals, e.g., messages, based on the information contained in a received NFN signal and/or information contained in internal memory, e.g., the network fault notification data 314 depicted in FIG. 3 of the access nodes 140, 150. In the FIG. 5 example, each access node 140, 150 sends NFN signals (512, 514), (516, 518), respectively, to the set of directly connected end nodes (144, 146), (154, 156), respectively, in response to reception of a NFN signal 508, 510, respectively, from the network fault notification server node 104. In some embodiments of the present invention, the NFN signals (e.g., 512, 514) sent by an access node (e.g., 140) to the set of directly connected end nodes (e.g., 144, 146, respectively) contain the same information, in which case the NFN signals (e.g., 512, 514) may be, and in some embodiments are, sent using multicast technology which may include the use of broadcast messages. In such an embodiment, signals 512 and 514 may be multicast messages, e.g., IP datagrams destined to an IP multicast group address.

In accordance with various embodiments of the present invention, the NFN signals carry sufficient information to enable the recipients to determine an appropriate course of action in response to reception of a NFN signal. For example, in some embodiments a NFN signal 508, 510, 512, 514, 516, 518 identifies the network node in which a fault occurred as well as the type of fault and/or the severity of the fault. In alternative embodiments of the invention, a NFN signal 508, 510, 512, 514, 516, 518 also includes information to assist the recipients in a recovery operation, e.g., information indicating the identity of an alternate node that provides an equivalent service to the indicated node in which a fault has occurred.

In accordance with the present invention, end nodes 144, 146, 154, 156 include fault recovery logic and processing information sufficient to determine the appropriate course of action upon reception of a NFN signal 512, 514, 516, 518. For example, in some embodiments each end node 144, 146, 154, 156, depicted in the FIG. 5 example includes a network fault processing module 412 and network fault processing data 414, as depicted in FIG. 4. In some embodiments, the network fault processing data 414 also includes a fault response database 419, which provides, for example, information about critical nodes that are important to the operation of the end node, possible faults in said critical nodes, and corresponding actions or operations that should be initiated in response to reported faults in said critical nodes. In various embodiments of the present invention, an end node, e.g., 144, 146, 154, 156, maintains a list of critical network nodes upon which the end node is dependent. One or more fault types may be, and in some embodiments are, associated with each critical network node in the list as well as an action or operation to be initiated in response to notification of the corresponding fault. Exemplary actions or operations that may be initiated or performed include modifying internal system parameters, protocol parameters, and/or protocol state; triggering of a soft-state refresh mechanism; changing a mode of operation, re-initializing a process, routine, module and/or the entire end node; and/or signaling a corresponding indication to a user of the end node.

FIG. 6 depicts a tabular representation 600 of a fault response database 419 of an end node implemented in accordance with the invention, e.g., the end node 400 as depicted in FIG. 4. The table 600 includes two primary columns: a first column 602 labeled "Fault Identification Information" and a second column 604 labeled "Response Action". The first column 602 provides sufficient information to enable the end node to identify specific faults associated with network nodes that are critical to the operation of the particular end node which stores the table 600. The second column 604 specifies response, e.g., recovery, actions to be taken by the end node upon notification or detection of a fault, e.g., via reception of a NFN signal, that corresponds to a fault identified in the first column 602. The fault identification information included in the first column 602 is further divided into two sub-columns: a first sub-column 606 labeled "Critical Node" and a second sub-column 608 labeled "Fault Type". Thus, specific faults are fully identified by identification of a critical node and a type of fault associated with the identified critical node. Each critical node identified in the first sub-column 606 has one or more associated fault types in the second sub-column 608.

The FIG. 6 illustration includes identification of three network nodes that are critical to operation of the end node, each of which is identified on a separate row 610, 620, 630 in the first sub-column 606. The mobility agent node is identified in the first row 610, the session signaling server node is identified in the second row 620, and the access node is identified in the third row 630. Each of these rows is further divided into one or more sub-rows, where a different sub-row is used for each fault type associated the particular critical node identified in the first sub-column 606. The mobility agent node and session signaling server nodes each have, in this example, three associated fault types (e.g., failure, reboot, scheduled outage), each of which is identified on a separate sub-row (612, 614, 616), (622, 624, 626), respectively, in the second sub-column 608. The access node has two associated fault types (e.g., reboot, overload), each of which is also identified on a separate sub-row 632, 634 in the second sub-column 608.

For each specific fault identified in the first column 602, there is a corresponding response action specified in the second column 604. For example, upon reception of a NFN signal indicating that the mobility agent node (identified in sub-column 606 and row 610) has experienced a reboot (identified in the sub-column 608 and sub-row 614), the end node will execute the response action indicated in the second primary column 604 and the same sub-row 614 as the indicated fault. Thus, as indicated, the end node should "Re-register with the same mobility agent node". In some embodiments, response actions include multiple steps or operations, e.g., as illustrated in (column 604, sub-row 616), (column 604, sub-row 626) and (column 604, sub-row 632). In some embodiments, response actions are dependent on other information included in the NFN signal in addition to fault identification information. For example, response actions depicted in (column 604, sub-row 616) and (column 604, sub-row 626) each make use of scheduled outage time information included in the NFN signal to control response action of the end node.

In accordance with the present invention, information regarding critical network nodes, fault types and corresponding actions, e.g., as depicted in FIG. 6, may be, and in some embodiments is, statically pre-configured in an end node while in other implementations is dynamically configured during operation of the end node. A combination of static/dynamic configuration within an end node is also possible. Furthermore, the configuration used in different nodes of the same network may be different. In some embodiments of the present invention, the end nodes dynamically modify the list of critical dependent nodes and associated fault recovery information that they maintain based on information acquired during normal operation of other processes, protocols, and/or modules internal to the end node. For example, in some embodiments, after an end node, e.g., 144, registers for service with a mobility agent node, e.g., 166, the end node 144 adds the mobility agent node 166 to its list of critical network nodes, e.g., in its fault response database 419. In some alternative embodiments of the present invention, information regarding critical network nodes and associated fault recovery is also, or alternatively, explicitly provided, e.g. signaled, to an end node by another network node, e.g., the directly connected access node.

In the FIG. 5 example, upon reception of the NFN signal 512, 514, 516, 518, each end node 144, 146, 154, 156, respectively, accesses information carried in the received signal as well as information in its internal memory, e.g., network fault processing data 414 and/or the network fault response database 419 as depicted in FIG. 4, to determine the appropriate course of action. This operation includes, for example, determination if the fault is associated with a critical node important to the operation of the end node, assessment of the severity of the fault, identification of other internal modules affected by the fault, signaling a fault indication to other internal modules affected by the fault, determination of response or recovery action corresponding to indicated fault and/or performance of any such response or recovery action. In some embodiments of the present invention, an internal network fault processing module 412 as depicted in FIG. 4 sends internal signals regarding indicated faults to other internal modules, thus enabling said other internal modules to respond to the indicated faults as required.

Figure 7:
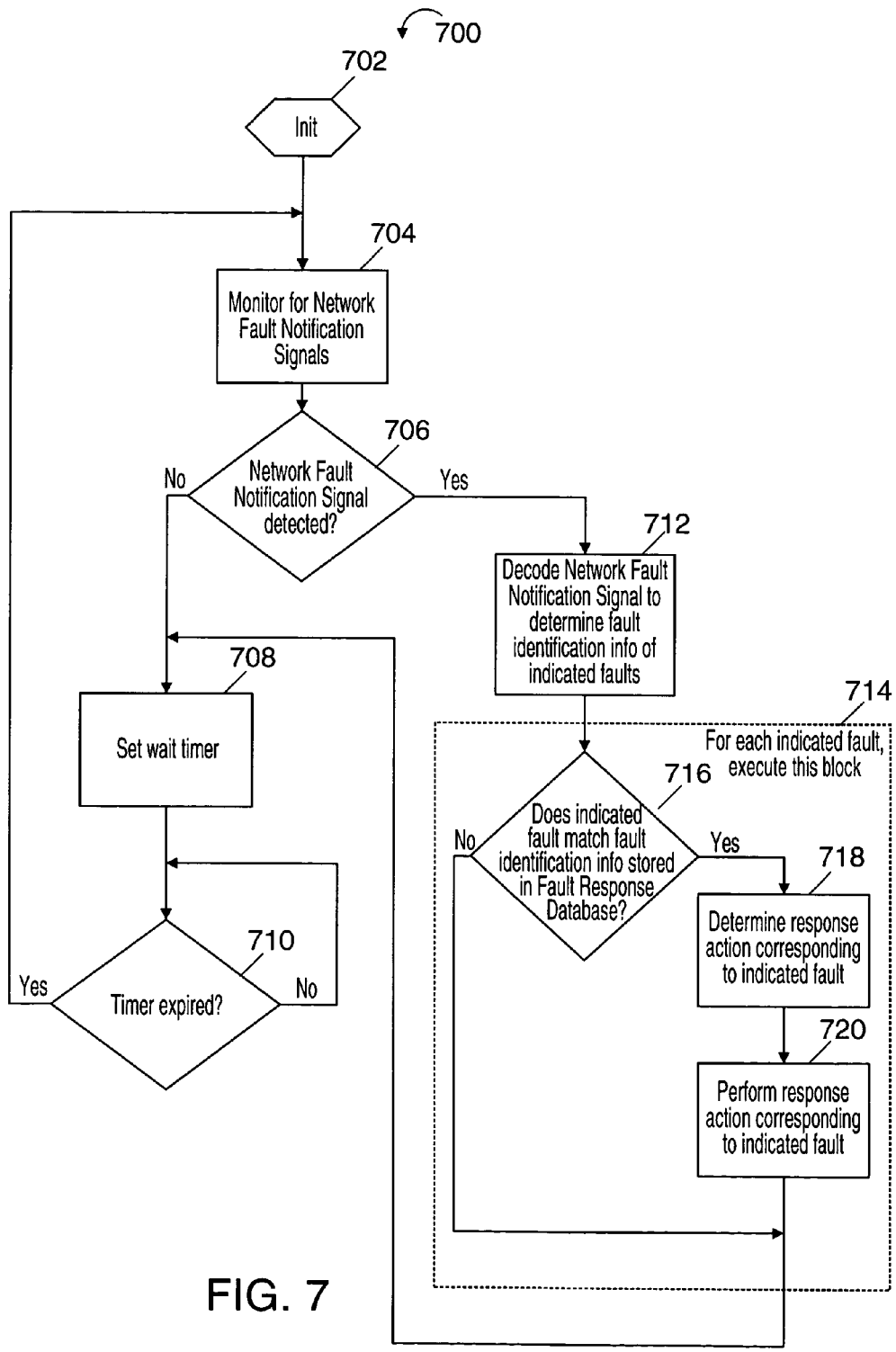
FIG. 7 illustrates the steps of an exemplary network fault processing routine as may be executed by an end node implemented in accordance with the invention.

FIG. 7 depicts a flowchart representation 700 of exemplary processing as may be performed by the network fault processing module 412 of an end node implemented in accordance with the invention, as depicted in FIG. 4. The FIG. 7 flowchart 700 includes an initialization step 702 (labeled 'Init'), as may be needed for initialization of constants, variables, functions, routines, and/or sub-routines. In accordance with the exemplary processing the end node periodically performs the steps of monitoring for NFN signals 704; determining if a NFN signal is detected 706; conditionally performing additional processing 712, 714, 716, 718, 720 when an NFN signal is detected; as well as setting a wait timer 708 and determining if said wait timer has expired 710 to control the periodicity of performing these steps. Upon detection of a NFN signal 706, the end node performs the step of decoding the NFN signal to determine included fault identification information 712. Then, for each fault indicated in the NFN signal, the end node performs the steps included in the dashed box 714.

Thus, for each indicated fault, the end node compares the fault identification information included in the NFN signal with the fault identification information stored by the end node 716, e.g., in the fault response database 419. If the indicated fault matches fault identification information stored by the end node, the end node further determines the response action corresponding to the indicated fault 718. Finally, the end node performs the corresponding response action 720. In some embodiments, the response action includes a plurality of steps to be performed by the end node, e.g., to ameliorate the effect of the indicated fault on the end node.

In the FIG. 5 example, if the NFN signals 512, 514, 516, 518 received by the respective end nodes 144, 146, 154, 156 indicate loss of state maintained by a $1^{st}$ mobility agent node 166 following a reboot, upon detection/reception of the NFN signals 512, 514, 516, 518, each end node 144, 146, 154, 156 first decodes the included fault identification information and determines if the indicated fault matches locally stored fault identification information. For example, an end node may determine the indicated fault is a match if the end node is registered for service with the $1^{st}$ mobility agent node 166. If the indicated fault matches locally stored fault identification information, the end node determines and performs the indicated response action. For example, an affected end node may perform the operations necessary to re-establish its state with the $1^{st}$ mobility agent node 166. Thus, in the case where end node mobility is supported by, for example, a Mobile IP home agent, an end node affected by the fault would, for example, re-register with the Mobile IP home agent by sending a new registration request message.

In some embodiments of the present invention, the NFN signals are disseminated to end nodes using paging technology to enable delivery of NFN signals to end nodes that are operating in a power conservation mode. For example, the access nodes 140, 150 depicted in FIG. 5 may queue, e.g., buffer, the NFN signals, e.g., messages, 512, 514, 516, 518 while awaiting subsequent transmission to the set of directly connected end nodes 144, 146, 154, 156, wherein said subsequent transmission of NFN signals 512, 514, 516, 518 will occur at a predetermined or scheduled time, e.g., during a periodically recurring paging time slot. Correspondingly, end nodes 144, 146, 154, 156 monitor the appropriate communication channel for NFN signals 512, 514, 516, 518 at the same predetermined or scheduled time.

In some embodiments, NFN signals are sent by an access node using broadcast or multicast technology, such that a group of end nodes, e.g., multiple end nodes directly connected to the access node, may receive the same transmitted NFN signal. To enable end node power conservation modes, such broadcast or multicast NFN signals may also be, and in some embodiments are, transmitted at predetermined or scheduled times, e.g., during one or more periodically recurring paging time slots. In such embodiments, a group of end nodes, e.g., all directly connected end nodes, monitor the appropriate communication channel at the same predetermined or scheduled times for the broadcast or multicast NFN signals, e.g., messages.

In some embodiments, each end node operating in a power conservation mode monitors for individual pages according to its own schedule, while a plurality of end nodes monitor for group pages, e.g., NFN signals, according to a common schedule. In other embodiments, the communication channel on which an NFN signal is transmitted and the schedule according to which it is transmitted is determined based on the specifics of the particular NFN signal, e.g., the relevant critical node, the type of fault or failure, or the set of relevant end nodes. The transmitting access node may use information contained in internal memory, e.g., network fault processing data 314 as depicted in FIG. 3, to make the channel and scheduling determination. In embodiments where NFN signals are transmitted over multiple channels and according to multiple schedules, each individual end node may, and in some embodiments does, monitor multiple communication channels according to one or more schedules as necessary to ensure reception of relevant NFN signals. Thus, the set of channels monitored by an end node and the schedule with which each channel is monitored may be, and in some embodiments is, determined by information contained in the internal memory of the end node, e.g., network fault processing data 414 as depicted in FIG. 4.

In some embodiments of the present invention, access nodes include fault detection capabilities. For example, the access nodes 140, 150 depicted in FIG. 5 may include a network fault notification module 312, as depicted in FIG. 3, where the network fault notification module 312 includes the ability to detect faults, errors, or failure of other internal components, modules, hardware and/or processes. In accordance with the present invention, detection of faults, errors, or failures by an access node 140, 150 may be either implicit or explicit as previously described. In addition, detection of faults by an access node 140, 150 is not limited to internal components, modules, and/or processes, e.g., an access may detect faults through signaling or protocol exchanges with other network nodes. For example, an access node 140, 150 may, and in some embodiments does, execute a network routing protocol, which provides, e.g., reachability and routing information to other network nodes. Normal operation of a routing protocol typically provides information regarding the reachability of other network nodes. Thus, in an exemplary embodiment of the invention as described above, loss of reachability to a critical network node is a fault detected by the network fault notification module 312 of the access node 300.

Upon the detection of a fault, error, or failure, an access node 140, 150 implemented in accordance with the present invention accesses its internal network fault notification data 314, as depicted in FIG. 3, to determine the type of fault and any action required. This operation may include, e.g., assessment of the severity of the detected fault, determination of a set of affected network nodes and/or determination of the need to send an indication of the detected network fault to some set of network nodes. In some embodiments of the present invention, an access node 140, 150 sends an indication of the detected fault, e.g., an ALRT signal, to the network fault notification server node 104. In some embodiments of the present invention, an access node also, or alternatively, sends an indication of the detected fault, e.g., a NFN signal, to the set of directly connected end nodes (144, 146), (154, 156), respectively.

In some embodiments of the present invention, NFN signals are sent in anticipation of planned or scheduled outages of critical network nodes. For example the network fault notification server node 104 depicted in FIG. 5 may have a priori knowledge or information regarding planned or scheduled outages, e.g., a maintenance operation, of a critical network node, e.g., a mobility agent node 166. Various mechanisms may be used to provide the planned or scheduled outage information to the network fault notification server node 104. In some embodiments of the present invention, planned or scheduled outage information regarding critical network nodes is included in the network fault notification data 214, as depicted in FIG. 2, of the network fault notification server node 104. In some embodiments of the present invention, a priori information regarding a planned or scheduled outage is also, or alternatively, sent in a signal, e.g., an ALRT signal, to the network fault notification server node 104. Signals that provide indications of planned or scheduled outages of a critical network node may be provided directly by the relevant critical network node and/or by another network node, e.g., network management node.

In accordance with some embodiments of the present invention, a prior knowledge or information regarding planned or scheduled outages of critical network nodes is used by a network fault notification server node 104, to trigger sending of a NFN signal 508, 510 to one or more other network nodes, e.g., all access nodes 140, 150 as depicted in the FIG. 5 example. The network fault notification server node 104 may, and in some embodiments does, access its internal network fault notification data 214, as depicted in FIG. 2, to determine the type of outage and any action required. This operation may include, e.g., assessment of the impact of the planned or scheduled outage, determination of a set of affected network nodes and/or determination of the need to send an indication of the detected network fault to some set of network nodes. In some embodiments, NFN signals 508, 510 associated with a planned or scheduled outage are sent at a pre-determined time period prior to the occurrence of the outage. In accordance with the some embodiments of the present invention, NFN signals 508, 510 associated with a planned or scheduled outage also carry additional information to enable the recipients to determine an appropriate course of action in response to reception of the NFN signal and/or assist the recipients in a recovery operation. For example, NFN signals 508, 510 associated with a planned or scheduled outage may include information indicating the expected duration of the outage or information regarding alternative service options.

In some alternative embodiments of the present invention, the NFN signals are used to disseminate information regarding other events that should cause an end node, e.g. mobile device, to take corrective action or perform an automated operation. Other examples include: notification of software changes and/or software upgrades causing a end node to download a new version of software or otherwise alter its mode of operation, notification of administrative or operational policy change causing a end node to renegotiate quality of service parameters or point of attachment to the network, and/or notification of emergency conditions causing a end node to alter its mode of operation.

In some embodiments of the present invention, communications between nodes is based all, or in part, on the Internet Protocol (IP). Thus, communication of both data and/or control signaling between the network fault notification server node 104, access nodes 130, 140, 150, end nodes 134, 136, 144, 146, 154, 156 and other network nodes 162, 164, 166, 168, 110, 112 may use IP packets, e.g., datagrams. In some embodiments of the present invention, control signaling as described is based all, or in part, on the Simple Network Management Protocol (SNMP). In such embodiments, and in accordance with SNMP architecture terminology, the network fault notification server node 104 may be a network management station, while other network nodes may be network elements that incorporate management agents. Additionally, the fault detection functionality using the SQRY 502 and SRSP 504 signals as previously described can be implemented using SNMP polling, while the fault detection functionality using the ALRT signals 506 as previously described can be implemented using SNMP traps.

In embodiments of the present invention that utilize IP packets for control signaling, said IP packets may be delivered to the intended destination nodes using either unicast or multicast addressing and delivery mechanisms. The use of IP multicast is particular useful when the same information is sent from one node to a plurality of other nodes. This is typically the case for NFN signals that target a plurality of nodes, e.g., the NFN signals 508, 510, 512, 514, 516, 518 depicted in FIG. 5. In cases where the same information, e.g., packet payload data, is sent to a plurality of targeted nodes using unicast delivery, a separate IP packet with a copy of the information is sent by the source node to each targeted node. Alternatively, when the same information is sent to a plurality of targeted nodes using multicast delivery, a single IP packet with the information is sent by the source node and network nodes replicate the packet as required for delivery to each targeted node. Thus, IP multicast provides a more efficient means of delivering information from a source node to a group of destination nodes.

In various embodiments of the present invention, IP multicast addressing and delivery is used to: (1) send NFN signals from a network fault notification server node 104 to a set of other network nodes, e.g., access nodes 130, 140, 150; (2) send NFN signals from an access node 130, 140, 150 to a set of directly connected end nodes (134, 136), (144, 146), (154, 156), respectively; and/or (3) send NFN signals from a network fault notification server node 104 to a set of end nodes, e.g., (134, 136), (144, 146), (154, 156). In the case where the network fault notification server node 104 sends NFN signals to the end nodes using IP multicast addressing and delivery, the access nodes, e.g., 130, 140, 150 may be, and in some embodiments are, configured such that end nodes need not dynamically join an IP multicast group to receive the NFN signals. For example, the access nodes may be configured to statically include the wireless interface for multicast routing of NFN signals, as if one or more end nodes is always joined to the appropriate multicast group.

Various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the present invention described above will be apparent to those skilled in the art in view of the above description of the invention. Such variations are to be considered within the scope of the invention.

What is claimed is:

1. A method of operating an end node in a communications system including at least one network node and said end node, the method comprising:

generating from Mobile IP signals directed to said end node or transmitted by said end node, a list of network nodes identifying network nodes used in routing signals to or from said end node, said Mobile IP signals including at least one of a Mobile IP agent solicitation message, a Mobile IP agent advertisement message, a Mobile IP registration message and a Mobile IP registration reply message;

receiving at the end node, via a first network node, a fault signal indicating a network node fault of a second network node that is different than the first network node;

determining, at the end node, using said generated list, whether or not the second network node is a network node that is used in routing signals to or from said end node; and initiating a fault response operation when it is determined that the second network node is used in routing of signals to or from said end node.

2. The method of claim 1, wherein said determining whether or not the second network node is a network node that is used in routing signals to or from said end node comprises:

comparing network node information included in the received fault signal to information in said generated list identifying at least one network node used in routing signals to or from said end node.

3. The method of claim 2, further comprising:

determining said fault response operation as a function of information stored in said end node, said stored information relating to a plurality of possible operations.

4. The method of claim 3, wherein said stored information further comprises a list of network nodes used in the routing of signals to said end node.

5. The method of claim 4, wherein said stored information further comprises information identifying a network node which is used by said end node as an access node through which said end node is coupled to other nodes in the communications network.

6. The method of claim 5, wherein the access node is a base station and wherein said end node is a mobile device that is coupled to said base station by a wireless communications link.

7. The method of claim 1, wherein said operating the end node to initiate a fault response operation comprises:

initiating said fault response operation as a function of fault response information stored in said end node, said stored fault response information relating to a plurality of possible operations;

wherein said initiating said fault response operation is also performed as a function of the second network node at which the fault occurred with said operation being elected from a plurality of possible operations based on both the type of fault and which one of a plurality of network nodes was the node at which the fault occurred.

8. The method of claim 7, further comprising dynamically generating at least a portion of said stored information identifying network nodes used in routing of signals to or from said end node from information included in sign is sent to or from said end node.

9. The method of claim 8, wherein said dynamically generating at least a portion of said stored information identifying network nodes comprises:

operating the end node to monitor for non-fault related signals and to generate at least some of said stored information from the monitored non-fault related signals.

10. The method of claim 9, wherein said non-fault related signals include session signaling messages communicated to or from said end node.

11. The method of claim 9, wherein said non-fault related signals are routing messages.

12. The method of claim 1, wherein said fault response operation comprises a Mobile IP registration operation.

13. The method of claim 1, wherein said fault response operation comprises an end node state update operation.

14. The method of claim 1, wherein said fault response operation comprises accessing stored information, identifying a plurality of possible operations and selecting from the plurality of possible operations the operation to be performed based on both the type of fault and which one of a plurality of network nodes was the indicated network node at which the fault occurred.

15. The method of claim 14, wherein said stored information comprises information identifying a network node which is used by said end node as at least one of a Mobile IP home agent, a Session Initiation Protocol proxy server and a Session Initiation Protocol location registrar.

16. The method of claim 14, further comprising dynamically generating at least a portion of said stored information identifying network nodes used in routing signals to said end node from information included in signals sent to or from said end node.

17. The method of claim 14, further comprising:

operating said end node to monitor for fault signals at preselected time intervals but not between said preselected time intervals.

18. A mobile communications device, comprising:

means for storing a set of information indicating network nodes which are used in routing of signals either to said mobile communications device or from said mobile communications device to other network nodes;

means for receiving messages via one or more network nodes including service interference notification messages indicating service interference at a network node;

means for generating at said mobile communications device, from Mobile IP signals directed to said mobile communications device or transmitted by said mobile communications device, a list of network nodes identifying network nodes used in routing signals to or from said mobile communications device, said Mobile IP signals including at least one of a Mobile IP agent solicitation message, a Mobile IP agent advertisement message, a Mobile IP registration message and a Mobile IP registration reply message;

means for processing received service interference notification messages, at said mobile communications device to determine, using said generated list, whether or not service interference indicated by a network service interference notification message received via the one or more network nodes indicates service interference at an other network node used in routing of signals either to said mobile communications device or from said mobile communications device, wherein the other network node is different than the one or more network nodes; and means for initiating a fault response operation when it is determined that the service interference indicated by the network service interference notification message indicates service interference at the other network node used in routing of signals either to said mobile communications device or from said mobile communications device.

19. The mobile communications device of claim 18, further comprising:

means for wireless transmission; and wherein said means for receiving messages comprises a radio receiver circuit.

20. The mobile communications device of claim 19, further comprising:
means for controlling the mobile communications device to monitor for said service interference notification messages at preselected intervals but not between said preselected time intervals.

21. A mobile communications device comprising:
memory;
receiver circuitry for receiving messages from network nodes including service interference notification messages indicating service interference at a network node; and
a processor module configured to:
generate a list of network nodes identifying network nodes used in routing signals to or from said mobile communications device, wherein said list comprises information identifying each network node which is used by said mobile communications device as at least one of a Mobile IP home agent, a Session Initiation Protocol proxy server and a Session Initiation Protocol location registrar;
store said list in said memory;
process, at said mobile communications device, received service interference notification messages to determine whether or not service interference indicated by a network service interference notification message received via one or more network nodes indicates service interference at an other network node used in routing of signals either to said communications device or from said communications device, wherein the other network node is different than the one or more network nodes; and
initiate a fault response operation when it is determined that the service interference indicated by the network service interference notification message indicates service interference at the other network node used in routing of signals either to said communications device or from said communications device.

22. The communications device of claim 21, wherein said processor module is further configured to generate the list to include fault response actions to be taken to respond to faults at network nodes used in routing of IP packets to said mobile node.

23. The communications device of claim 22, wherein one of said fault response actions is a Mobile IP registration operation.

24. A device operative in a communications system including at least one network node and an end node, the device comprising:
means for generating from Mobile IP signals directed to said end node or transmitted by said end node, a list of network nodes identifying network nodes used in routing signals to or from said end node, said Mobile IP signals including at least one of a Mobile IP agent solicitation message, a Mobile IP agent advertisement message, a Mobile IP registration message and a Mobile IP registration reply message;
means for receiving, via a first network node, a fault signal indicating a network node fault of a second network node that is different than the first network node;
means for determining, using said generated list, whether or not the second network node is a network node that is used in routing signals to or from said end node; and
means for initiating a fault response operation when it is determined that the second network node is used in routing of signals to or from said end node.

25. The device of claim 24 further comprising:
means for comparing network node information included in the received fault signal to information in said generated list identifying at least one network node used in routing signals to or from said end node.

26. A non-transitory computer readable medium embodying machine executable instructions for controlling an end node in a communications system including at least one network node and said end node, the computer readable medium comprising computer readable instructions for:
generating from Mobile IP signals directed to said end node or transmitted by said end node, a list of network nodes identifying network nodes used in routing signals to or from said end node, said Mobile IP signals including at least one of a Mobile IP agent solicitation message, a Mobile IP agent advertisement message, a Mobile IP registration message and a Mobile IP registration reply message;
receiving, via a first network node, a fault signal indicating a network node fault of a second network node that is different than the first network node;
determining, at the end node, using said generated list, whether or not the second network node is a network node that is used in routing signals to or from said end node; and
initiating a fault response operation when it is determined that the second network node is used in routing of signals to or from said end node.

27. The non-transitory computer readable medium of claim 26 further comprising computer readable instructions for:
comparing network node information included in the received fault signal to information in said generated list identifying at least one network node used in routing signals to or from said end node.

28. A device operative in a communications system including at least one network node and an end node, the device comprising:
means for receiving, via a first network node, a fault signal indicating a network node fault of a second network node that is different than the first network node;
means for determining, at the end node, whether or not the second network node is a network node that is used in routing signals to or from said end node; and
means for initiating a fault response operation when it is determined that the second network node is used in routing of signals to or from said end node;
wherein said means for determining whether or not the second network node is a network node that is used in routing of signals to or from said end node comprises:
means for comparing network node information included in the received fault signal to stored information identifying at least one network node used in routing signals to or from said end node; and
means for determining said fault response operation as a function of fault response information stored in said end node prior to receiving the fault signal, said stored fault response information relating to a plurality of possible operations;
wherein said means for determining also operates as a function of the second network node at which the fault occurred with said operation being selected from a plurality of possible operations based on both the type of fault and which one of a plurality of network nodes was the node at which the fault occurred.

29. A non-transitory computer readable medium embodying machine executable instructions for controlling an end node in a communications system including at least one network node and said end node, the computer readable medium comprising computer readable instructions for:

receiving, via a first network node, a fault signal indicating a network node fault of a second network node that is different than the first network node;

determining, at the end node, using said generated list, whether or not the second network node is a network node that is used in routing signals to or from said end node; and initiating a fault response operation when it is determined that the second network node is used in routing of signals to or from said end node;

wherein said determining whether or not the second network node is a network node that is used in routing of signals to or from said end node comprises:

comparing network node information included in the received fault signal to stored information identifying at least one network node used in routing signals to or from said end node; and determining said fault response operation as a function of fault response information stored in said end node prior to receiving the fault signal, said stored fault response information relating to a plurality of possible operations;

wherein said determining is also performed as a function of the second network node at which the fault occurred with said operation being selected from a plurality of possible operations based on both the type of fault and which one of a plurality of network nodes was the node at which the fault occurred.

30. A mobile communications device, comprising:

memory including a set of stored information indicating network nodes which are used in routing of signals either to said mobile communications device or from said mobile communications device to other network nodes;

receiver circuitry for receiving messages via one or more network nodes including service interference notification messages indicating service interference at a network node;

a list generation module for generating from Mobile IP signals directed to said mobile communications device or transmitted by said mobile communications device, a list of network nodes identifying network nodes used in routing signals to or from said mobile communications device, said Mobile IP signals including at least one of a Mobile IP agent solicitation message, a Mobile IP agent advertisement message, a Mobile IP registration message and a Mobile IP registration reply message; and a processor for processing received service interference notification messages to determine, using said generated list, whether or not service interference indicated by a network service interference notification message receive via the one or more network nodes indicates service interference at an other network node used in routing of signals either to said mobile communications device or from said mobile communications device, and for initiating a fault response operation when it is determined that the service interference indicated by the network service interference notification message indicates service interference at the other network node used in routing of signals either to said mobile communications device or from said mobile communications device.

31. The mobile communications device of claim 30, further comprising:

a wireless transmitter; and wherein said receiver circuitry comprises a radio receiver circuit.

32. A device operative in a communications system including at least one network node and an end node, the device comprising:

means for generating from Mobile IP signals directed to said end node or transmitted by said end node, a list of network nodes identifying network nodes used in routing signals to or from said end node, said Mobile IP signals including at least one of a Mobile IP agent solicitation message, a Mobile IP agent advertisement message, a Mobile IP registration message and a Mobile IP registration reply message;

means for receiving, via a first network node, a fault signal indicating a network node fault of a second network node that is different than the first network node;

means for determining, at the end node, using said generated list, whether or not the second network node is a network node that is used in routing signals to or from said end node; and means for initiating a fault response operation when it is determined that the second network node is used in routing of signals to or from said end node.

33. The device of claim 32, wherein said means for determining whether or not the network node fault corresponds to a network node that is used in routing signals to or from said end node comprises:

means for comparing network node information included in the received fault signal to information in said generated list identifying at least one network node used in routing signals to or from said end node.

34. The device of claim 33, further comprising:

means for determining said fault response operation as a function of information stored in said end node, said stored information relating to a plurality of possible operations.

35. The device of claim 32, wherein said means for operating the end node to initiate a fault response operation comprises:

means for initiating said fault response operation as a function of fault response information stored in said end node, said stored fault response information relating to a plurality of possible operations;

wherein said means for initiating said fault response operation also operates as a function of the second network node at which the fault occurred with said operation being elected from a plurality of possible operations based on both the type of fault and which one of a plurality of network nodes was the node at which the fault occurred.

* * * * *